(12) United States Patent
Kobayashi

(10) Patent No.: US 8,351,608 B2
(45) Date of Patent: Jan. 8, 2013

(54) LICENSE MANAGEMENT APPARATUS AND METHOD AND LICENSE MANAGEMENT SYSTEM

(75) Inventor: Makoto Kobayashi, Tokyo (JP)

(73) Assignee: Canon Kabushiki Kaisha (JP)

( * ) Notice: Subject to any disclaimer, the term of this patent is extended or adjusted under 35 U.S.C. 154(b) by 826 days.

(21) Appl. No.: 12/434,389

(22) Filed: May 1, 2009

(65) Prior Publication Data

US 2009/0274304 A1 Nov. 5, 2009

(30) Foreign Application Priority Data

May 2, 2008 (JP) ................................. 2008-120768

(51) Int. Cl.
*H04L 9/00* (2006.01)
(52) U.S. Cl. .............. 380/277; 705/59; 726/26; 726/31; 380/278
(58) Field of Classification Search .................... 705/51, 705/59; 726/26, 31; 380/277, 278
See application file for complete search history.

(56) References Cited

U.S. PATENT DOCUMENTS

| | | | |
|---|---|---|---|
| 6,581,160 B1 * | 6/2003 | Harada et al. ................. 713/169 |
| 7,028,340 B1 * | 4/2006 | Kamada et al. ................ 726/29 |
| 7,155,415 B2 * | 12/2006 | Russell et al. ................. 705/59 |
| 7,260,646 B1 * | 8/2007 | Stefanik et al. ............... 709/238 |
| 7,260,720 B2 * | 8/2007 | Yamamoto et al. ........... 713/169 |
| 7,503,066 B2 * | 3/2009 | Tatebayashi et al. .......... 726/17 |
| 7,567,668 B2 * | 7/2009 | Gammel et al. ............... 380/28 |
| 7,725,721 B2 * | 5/2010 | Yellai et al. ................... 713/171 |
| 7,831,831 B2 * | 11/2010 | Ohmori et al. ................ 713/175 |
| 2002/0049679 A1 * | 4/2002 | Russell et al. ................. 705/52 |
| 2003/0028622 A1 * | 2/2003 | Inoue et al. .................... 709/219 |
| 2003/0037006 A1 * | 2/2003 | Maruyama et al. ............ 705/59 |
| 2004/0003239 A1 * | 1/2004 | Ohmori et al. ................ 713/158 |
| 2005/0192905 A1 * | 9/2005 | Rutan et al. .................... 705/59 |
| 2006/0106727 A1 * | 5/2006 | Yellai et al. .................... 705/59 |
| 2006/0106728 A1 * | 5/2006 | Yellai et al. .................... 705/59 |
| 2006/0179002 A1 * | 8/2006 | Brooks et al. .................. 705/59 |
| 2007/0014397 A1 * | 1/2007 | Ukeda et al. ................... 380/30 |
| 2007/0172065 A1 * | 7/2007 | Lee et al. ....................... 380/259 |
| 2007/0198430 A1 * | 8/2007 | Takahashi et al. ............. 705/59 |
| 2008/0005033 A1 * | 1/2008 | Clark et al. .................... 705/59 |
| 2008/0021838 A1 * | 1/2008 | Wardaschka et al. .......... 705/59 |
| 2008/0276321 A1 * | 11/2008 | Svancarek et al. ............. 726/26 |

FOREIGN PATENT DOCUMENTS

JP 2006-217320 A 8/2006

* cited by examiner

*Primary Examiner* — Mamon Obeid
(74) *Attorney, Agent, or Firm* — Rossi, Kimms & McDowell LLP

(57) ABSTRACT

When a function inactivation process is instructed on an MFP A, all the functions are inactivated and a function inactivation certification key is issued, and then resources related to the functions are transmitted to an MFP-B. When reception of the resources is completed on the MFP-B, a function duplication completion certification key is issued. When these keys are input to a licensing server, a database is updated, and a function activation key is issued. When the function activation key is input to the MFP B, the functions related to the transmitted resources are carried out.

3 Claims, 13 Drawing Sheets

FIG. 3

| ACTIVE / INACTIVE | FUNCTION ID | DEVICE ID |
|---|---|---|
| 1 | a | iR_A |
| 1 | b | iR_A |
| 1 | c | iR_A |
| 1 | d | iR_A |

FIG. 4

| ACTIVE / INACTIVE | FUNCTION ID | DEVICE ID |
|---|---|---|
| 0 | a | iR_A |
| 0 | b | iR_A |
| 0 | c | iR_A |
| 0 | d | iR_A |
| 1 | a | iR_B |
| 1 | b | iR_B |
| 1 | c | iR_B |
| 1 | d | iR_B |

FIG. 5A

```
START OF INACTIVATION OF ALL APPLICATIONS
─────────────────────────────────────────
ALL APPLICATIONS WILL BE INACTIVATED.
INACTIVATION CERTIFICATION KEY WILL BE
DISPLAYED AFTER COMPLETION OF PROCESSING.
  ┌─ INACTIVATION CERTIFICATION KEY ─┐
  │                                  │
  │                                  │
  └──────────────────────────────────┘
                      [ OK ]  [ Cancel ]
```
~501

FIG. 5B

```
COMPLETION OF INACTIVATION OF
ALL APPLICATIONS
─────────────────────────────────────────
ALL APPLICATIONS HAVE BEEN INACTIVATED.
INACTIVATION CERTIFICATION KEY WILL BE
DISPLAYED AFTER COMPLETION OF PROCESSING.
  ┌─ INACTIVATION CERTIFICATION KEY ─┐
  │   1111-2222-3333-4444-5555-6666  │
  └──────────────────────────────────┘
            [ OK ]  [ Cancel ]  [ Next > ]
```
~502

FIG. 5C

```
TRANSMISSION OF APPLICATIONS
(DESIGNATION OF DESTINATION)
─────────────────────────────────────────
ALL APPLICATIONS THAT HAVE BEEN INACTIVATED
WILL BE TRANSMITTED. SELECT THE SERIAL
NUMBER OF THE DESTINATION DEVICE.
  ┌─ DESTINATION ────────────────────┐
  │       [ AAA0001      ▼ ]         │
  └──────────────────────────────────┘
                      [ OK ]  [ Cancel ]
```
~503

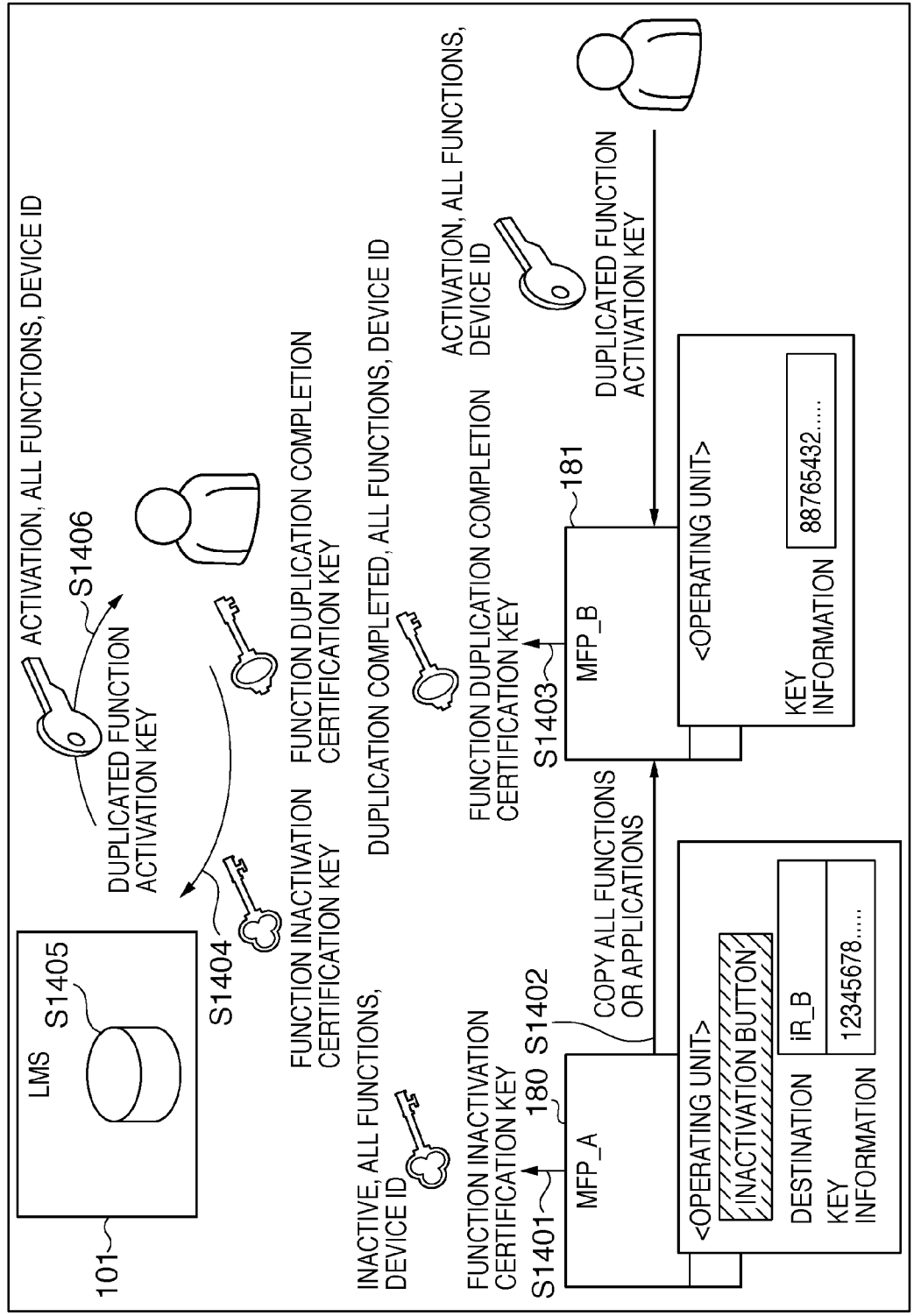

LICENSE MANAGEMENT APPARATUS AND METHOD AND LICENSE MANAGEMENT SYSTEM

BACKGROUND OF THE INVENTION

1. Field of the Invention

The present invention relates to a license management apparatus and method and a license management system.

2. Description of the Related Art

There are devices that can be connected to a network and on which an application program (hereinafter referred to as an "application") with a license can be installed. Moreover, a process that enables transfer of an application installed on a certain device and a legitimate license for the application to another device by using a license issuing server that manages the license has been proposed (see Japanese Patent Laid-Open No. 2006-217320 (page 10, FIG. 6, and the like), for example).

For example, when a device on which applications are installed is to be replaced with a new device due to breakdown, deterioration, or the like, it is necessary to transfer all the licensed applications to the new device. In such a case, when the system disclosed in Japanese Patent Laid-Open No. 2006-217320 is used, it is necessary to perform a transfer operation for each individual application and its legitimate license. Moreover, the system disclosed in Japanese Patent Laid-Open No. 2006-217320 requires that a connection between the license issuing server and the devices is established on a network or the like, where messages, such as transfer requests and removal notifications, are exchanged between the server and the devices.

SUMMARY OF THE INVENTION

Aspects of the present invention relate to a license management apparatus and method and a license management system that obviate the aforementioned needs and that enable transfer of a plurality of licenses using a simplified configuration and through a simple operation.

The present invention provides a license management apparatus including: a database in which a device is registered in association with licenses for functions licensed to the device; an accepting unit adapted to accept an inactivation certification key containing a device ID of a source device of transferred licenses, the inactivation certification key being issued by the source device (also referred to herein as a first device), and a duplication certification key containing a device ID of a destination device of the transferred licenses, the duplication certification key being issued by the destination device (also referred to herein as a second device); a registration changing unit adapted to, upon acceptance of input of the inactivation certification key and the duplication certification key by the accepting unit, inactivate, in the database, licenses for functions registered in association with the source device of the transferred licenses that is specified based on the inactivation certification key and register, in the database, the licenses for the functions that have been inactivated for the source device of the transferred licenses in association with the destination device of the transferred licenses that is specified based on the duplication certification key; and an activation key issuance unit adapted to issue an activation key to be inputted to the destination device of the transferred licenses to permit an activation process of the functions the licenses for which have been registered in association with the destination device.

According to another aspect, the present invention provides a licensed function providing device including: an accepting unit adapted to accept a license transfer instruction; an inactivating unit adapted to inactivate licenses for all of licensed functions upon acceptance of the license transfer instruction; a certification issuance unit adapted to issue an inactivation certification key that indicates completion of inactivation of the functions by the inactivating unit and a device ID for specifying the device on which the functions have been inactivated; and a duplicating unit adapted to send programs and/or data for realizing the functions inactivated by the inactivating unit to a destination device of transferred licenses, the destination device being not able to execute the transferred functions until an activation process of the functions is performed.

According to the present invention, the transfer of a plurality of licenses between devices can be realized using a simple configuration and through a simple operation.

Further features of the present invention will become apparent from the following description of an exemplary embodiment with reference to the attached drawings.

BRIEF DESCRIPTION OF THE DRAWINGS

FIG. 3 is a diagram showing an example of a license management database or a temporarily created list of items to be transferred.

FIG. 4 is a diagram showing another example of a license management database or a temporarily created list of items to be transferred.

FIGS. 5A to 5C are diagrams showing an example of a user interface of a source device of transferred licenses.

FIG. 14 is a diagram showing an overview of the operation of the present invention.

DESCRIPTION OF THE EMBODIMENT

First Embodiment

Figure 1:
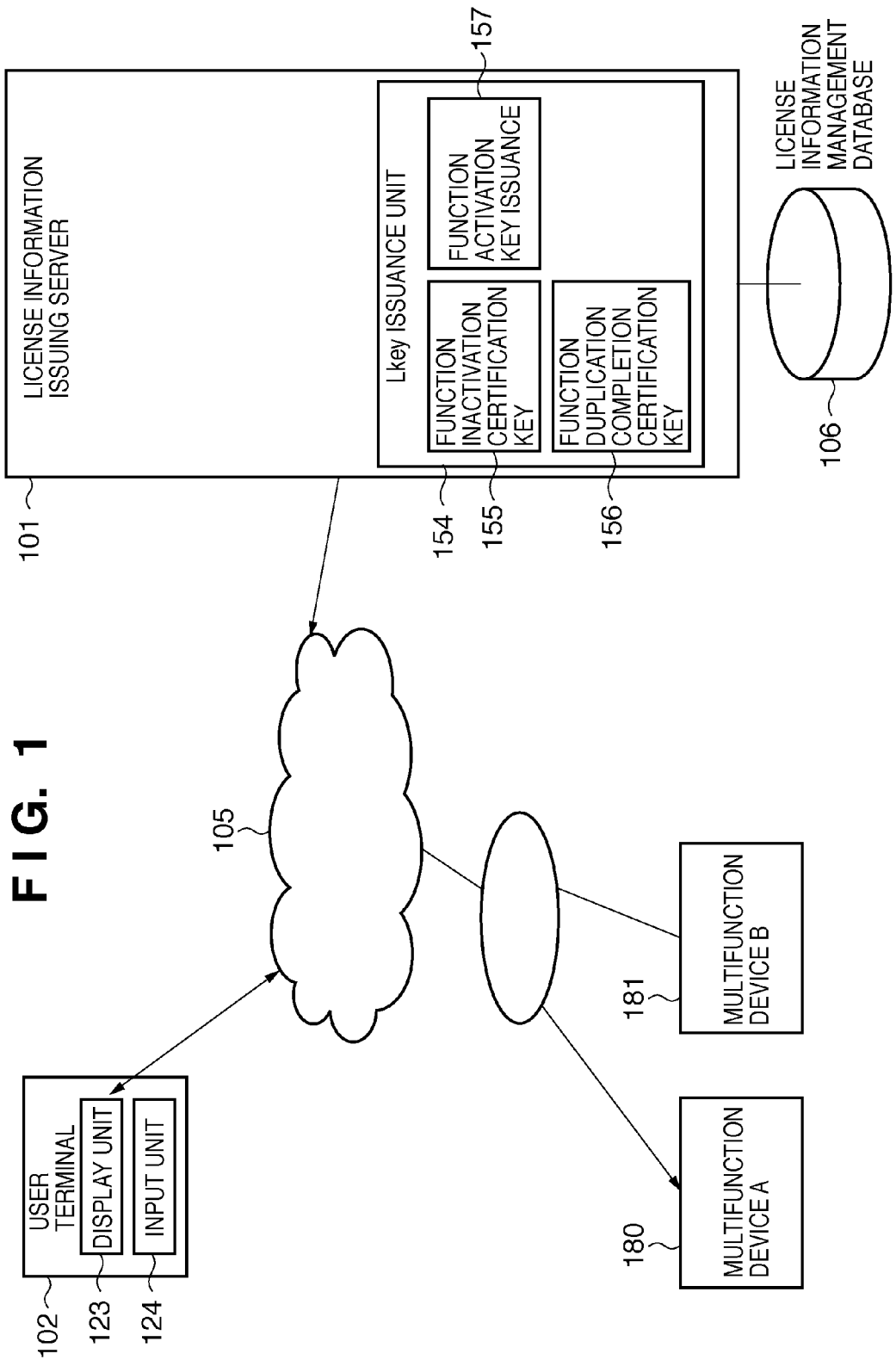
FIG. 1 is a diagram showing the system configuration according to an embodiment of the present invention.

Hereinafter, referring to the drawings, a preferred embodiment of the present invention will be described in detail by way of example. However, it is to be understood that constituent elements as set forth in the present embodiment are given for illustrative purpose only and the scope of the present invention is not to be construed as being limited by these constituent elements.

<System Configuration>

FIG. 1 is a diagram showing the configuration of a network system including an information processing apparatus according to the preferred embodiment of the present invention. This network system is used for software management and particularly is a system for preventing unauthorized use of software. With this system, for example, license information can be issued in exchange for input of an individual number that is used to uniquely identify a device into which software is introduced.

Figure 13:
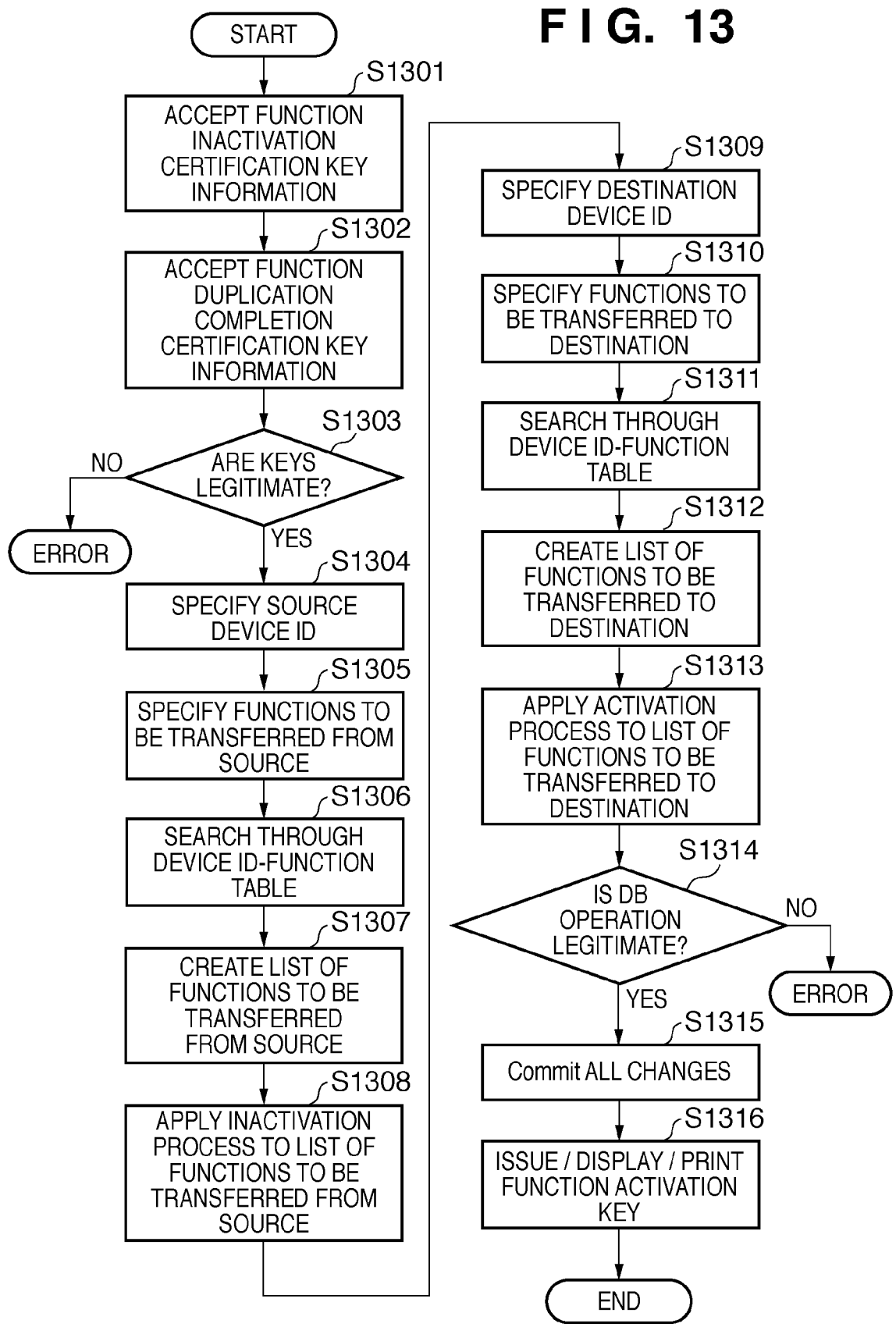
FIG. 13 is a flowchart of database update at the license issuing server.

A license issuing server 101 is an information processing apparatus that conducts the whole license information issuing process and is an example of the license management apparatus. The license issuing server 101 realizes an accepting means that is adapted to accept input of function inactivation certification key information (an inactivation certification key) issued by a source device of transferred licenses and function duplication completion certification key information (a duplication certification key) issued by a destination device of the transferred licenses. Moreover, the license issuing server 101 also realizes a registration changing means. The registration changing means is adapted to accept the function inactivation certification key information and the function duplication completion certification key information, inactivate, in a database, licenses for functions registered with the source device of the transferred licenses, and register, in the database, the licenses for the inactivated functions in association with the destination device of the transferred licenses. Moreover, the license issuing server 101 also realizes an activation key issuing means that is adapted to issue an activation key to be input to the destination device of the transferred licenses to permit an activation process of the functions the licenses for which have been registered in association with the destination device. The license issuing server 101 has the configuration of a general-purpose computer and realizes each means by executing a precoded program using a processor, a memory, a network interface, and the like. One of procedures of this program is illustrated by a flowchart in FIG. 13, which will be described later. It should be noted that the "license" as referred to in the present embodiment is synonymous with license information that indicates that permission to execute a specific function is granted.

A user terminal 102 is an information processing apparatus managed by a user. Any information processing apparatus that can be connected to a network and on which software can be installed, such as a personal computer, a mobile terminal, a printer, or a copier, can be used as the user terminal 102. The user terminal 102 is connected to the license issuing server 101 on a network 103 and functions also as a terminal of the license issuing server 101.

Digital multifunction devices 180 and 181 are multifunction devices on which various applications operate by having licenses issued from the license issuing server 101 installed thereon. That is to say, the multifunction devices 180 and 181 function as licensed function providing devices that are capable of executing a licensed function. There is a plurality of multifunction devices, and the multifunction devices are connected to one another. In FIG. 3, the multifunction devices are connected to the license issuing server 101; however, with respect to the invention of the present embodiment, the multifunction devices 180 and 181 and the license issuing server 101 may be offline (i.e., do not have to be directly connected on a network). As the source of the transferred licenses, the multifunction devices 180 and 181 each realize an accepting means that is adapted to accept a license transfer instruction and an inactivating means that is adapted to inactivate licenses for all of licensed functions in response to the license transfer instruction. Furthermore, each multifunction device also realizes a certification issuing means that is adapted to issue function inactivation certification key information that indicates completion of inactivation of the functions and a device ID for specifying the device on which the functions have been inactivated. Furthermore, each multifunction device also functions as a duplicating means that is adapted to send programs and/or data for realizing the functions whose licenses have been inactivated to the destination device of the transferred licenses, which is not able to execute the transferred functions until an activation process of the functions is executed. Here, a function for which a license is granted is realized by a computer executing an application program corresponding to the function or referencing data. Such an application program or data will be simply referred to as an "application" in the present embodiment. Furthermore, a multifunction device as the destination of the transferred licenses also functions as a completion key issuing means.

A license information management database 106 is connected to the license issuing server 101, and at least a device ID of a multifunction device, an ID of a function (or an application), and information that indicates whether the function is active or inactive are registered therein in association with one another. FIG. 4 shows an example of the database 106. In FIG. 4, a function ID is related to a device ID, and, furthermore, a flag that indicates whether the function ID is active or inactive is registered in association therewith.

A function activation key issuance unit 154 corresponds to the activation key issuing means and includes a function inactivation certification key input module 155, a function duplication completion certification key input module 156, and a function activation key issuing module 157.

A display unit 123 is a display unit included in the user terminal 102, and, for example, the function activation key information (or the activation key) is displayed thereon. An input unit 124 is an input unit included in the user terminal 102. The function inactivation certification key and the function duplication completion certification key are input through the input unit 124.

Activation key information issued from the license issuing server 101 is required in order to activate software managed by the present system after installation of the software on a multifunction device managed by the user. The license issuing server 101 issues the activation key information when proper function inactivation certification key information (inactivation certification key) and function duplication completion certification key information (duplication certification key) are inputted.

Identification information (i.e., an ID) of the destination device on which the software is installed can be embedded into the activation key information. Accordingly, an apparatus that has generated the key can be specified based on the key information.

Figure 2:
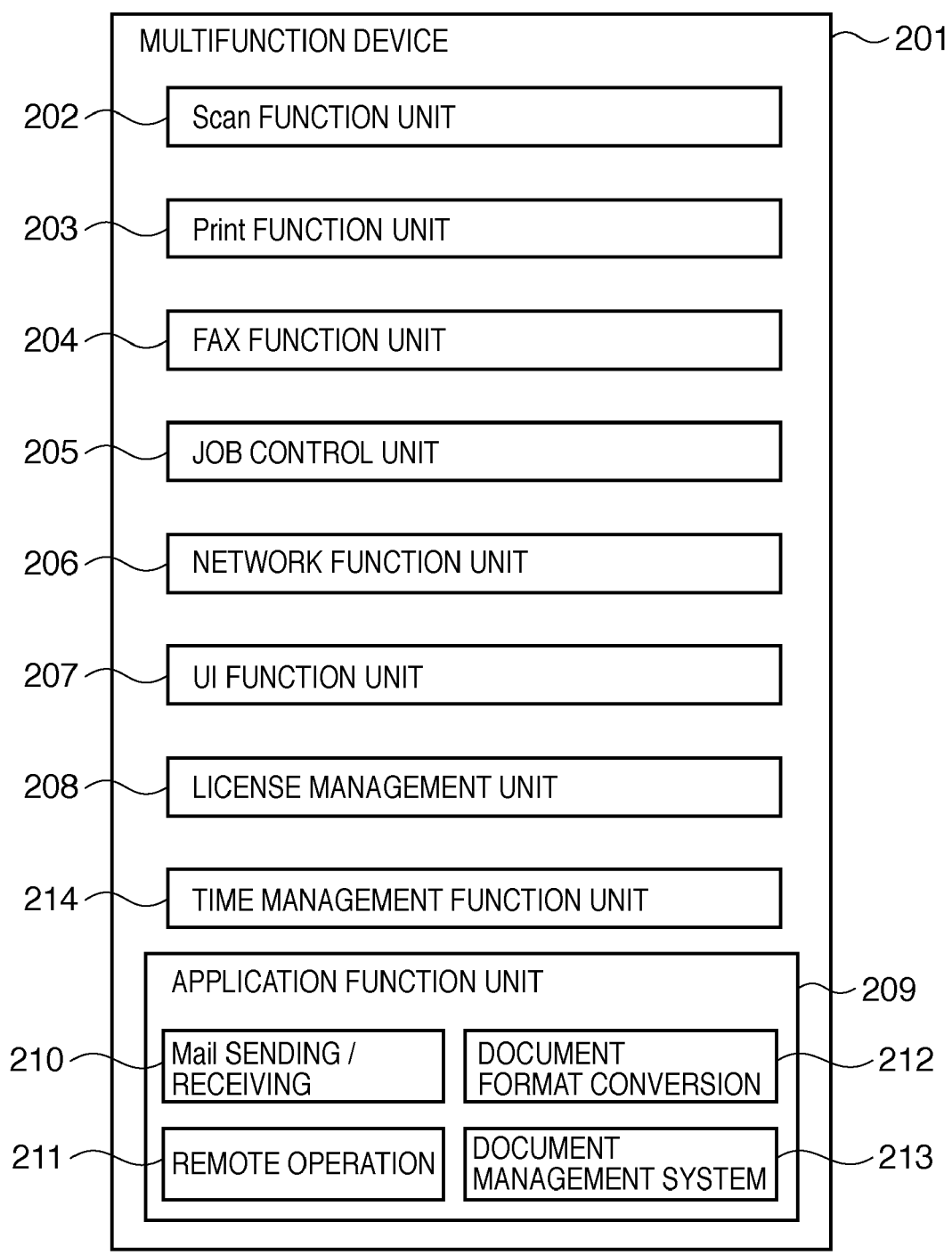
FIG. 2 is a functional block diagram of a multifunction device according to the embodiment of the present invention.

FIG. 2 is a functional block diagram of a multifunction device according to the present embodiment. The multifunction device is provided with an image scanner, a printer, a communications interface, and a user interface (UI). The multifunction device carries out a function indicated through the UI or a function indicated via the communications interface. Furthermore, the multifunction device has a plug-in function for adding or removing a function by, for example, adding or removing an application program executed on a platform such as JAVA (registered trademark). The application program (i.e., the function realized by the application program) cannot be executed until the application is not only simply installed but activated. Activation may be a simple mechanism of, for example, setting an active flag by an activation process, or it may be a complicated mechanism of, for example, replicating a license file that needs a predetermined authentication procedure and undergoing the authentication procedure. More specifically, the multifunction device has the following configuration.

A multifunction device 201 corresponds to the multifunction device 180 or 181 in FIG. 1. A scanner function unit 202 has a function of reading and converting a paper document into binary image data. A print function unit 203 has a function of adding a command intended for a printer to an image that has previously been read and converted into the binary image data by the scanner function unit 202 and outputting the image to a printer device. Moreover, a facsimile function unit 204 encodes the image that has been read and converted into the binary image data by the scanner function unit 202 in compliance with a facsimile standard such as G3 or G4. The facsimile function unit 204 also has a function of performing image communications with an external facsimile according to a protocol compliant with the facsimile standard. The facsimile function unit 204 also has a function of sending and receiving a facsimile image to and from an external facsimile in compliance with the facsimile standard. A job control function unit 205 queues the binary image data received from the scanner function unit 202 and facsimile image data received from the outside by the facsimile function unit 204 as print jobs. The job control function unit 205 has a job control function of sequentially outputting the jobs to the print function unit 203, the facsimile function unit 204, and a network function unit 206, which will be described later, as appropriate. The network function unit 206 has various network protocol functions, such as TCP/IP, HTTP, FTP, LDAP, SNMP, SMTP, and SSL. A user interface function unit 207 manages input and output from the user through an operation panel of the multifunction device 201 and displays an input field, an output message field, and the like on the operation panel. Moreover, the user interface function unit 207 has a function of receiving an input value input into the input field by the user and providing notification to another function unit, and also displaying a message from another function unit to the user on a predesigned screen. A license management unit 208 performs inactivation or activation of functions depending on the licenses for various applications within an application function unit 209 using the UI function unit 207 or an information terminal (not shown) on a network.

The application function unit 209 has a function of performing installation, user authentication, execution, and uninstallation of various applications that operate on the multifunction device 201. Moreover, the application function unit 209 sets an expiration date of each application at the time of application installation. Then, during execution of the application, the application function unit 209 determines the expiration date, which is preset at the time of application installation, using the function of a time management unit 214, which will be described later, thereby realizing an application with an expiration date. The application's expiration date may be set by storing expiration date information inside an application object, or it may be set as another object as additional information of the application at the time of application installation. Moreover, the expiration date is expressed as the number of days from installation until the application no longer operates. The expiration date may be the number of days indicating the period of validity as in the present embodiment, or it may be the date of expiration, for example, until what day of what month of what year. Even in the case where the expiration date is the date of expiration, it is obvious that the number of days indicating the period of validity is calculated from a system clock inside the multifunction device 201. Furthermore, the expiration date may also be expressed in smaller units, for example, in seconds, than the number of days. It goes without saying that also in this case, the expiration date can be calculated as long as the unit is within the range of units the system's internal clock can measure. This expiration date is passed to an installation time setting function, which will be described later, at the time of application installation as a parameter and stored in a nonvolatile storage area within the multifunction device 201.

A mail application 210 is one of applications of the multifunction device 201 that operate on the application function unit. The mail application 210 has a function of receiving an e-mail to which an electronic document is attached sent from an information terminal on the network using the network function unit 206 and printing the e-mail using the print function unit. The mail application 210 also has a function of attaching the electronic document that has been read using the scanner function unit 202 to an e-mail and sending the e-mail with the electronic document to a predetermined destination. A remote operation application 211 is one of the applications of the multifunction device 201 that operate on the application function unit. The remote operation application 211 has a function of displaying the same interface as a main-body touch panel that is displayed on the main body of the multifunction device on an information terminal (not shown) on the network using the UI function unit and thus enabling remote operation. A document format conversion application 212 is one of the applications of the multifunction device 201 that operate on the application function unit. The document format conversion application 212 has a function of performing conversion into a preset electronic data format. Electronic data read by an operator using the scanner function unit 202 and electronic data sent from an information terminal on the network and received using the network function unit 206 are items that are to be converted. A document management system application 213 is one of the applications of the multifunction device 201 that operate on the application function unit. The document management system application 213 has a function of storing data in a preset document storage location on the network or within the main body of the multifunction device. Electronic data read with the scanner function unit 202 by the operator operating the main body and electronic data sent from an information terminal on the network and received using the network function unit 206 are items that are to be stored.

The mail sending/receiving application 210, the remote operation application 211, the document format conversion application 212, and the document management system application 213 can perform user authentication. All of these applications use a user authentication function unit 208 through the application function unit 209 when used by the operator.

A time management function unit 214 uses a system's internal clock and provides an interface through which all the function modules of the multifunction device 201 can use the system's internal clock to set the time, refer to the time, and so on. The time management function unit 214 also has a function of retaining a cumulative setting difference time from the start of the system in a nonvolatile storage area, such as a so-called flash ROM. The time management function unit 214 also has a time adjustment function that uses a time synchronization service on the network to which the multifunction device 201 is connected. A time synchronization service refers to a time synchronization service using a protocol defined by the TIME protocol (RFC 868), the NTP protocol (RFC 1305), the SNTP protocol (RFC 1769), or the like. Furthermore, in order to perform expiration date determination for an application with an expiration date, the time management function unit 214 has a function of setting an installation time at the time of application installation, which will be described later.

<License Transfer Procedure>

Next, transfer (relocation) of licenses for applications from a multifunction device to a multifunction device, which is an invention according to the present embodiment, will be described. FIG. 14 is a diagram showing an outline of the present embodiment and shows how all the licenses held by a multifunction device (abbreviated as MFP in FIG. 14) A 180 are transferred from the MFP A 180 to an MFP B 181. Here, not all of the licenses have to be transferred. In other words, the licenses to be transferred may be some of all of the licenses, or all of the licenses in a predefined group.

In FIG. 14, first, when the operator presses an inactivation button of the MFP A 180, which is a source device of transferred licenses, and inputs a device ID of a destination device of the transferred licenses, functions licensed to the MFP A 180 are inactivated. This inactivation process may be regarded as inactivation of the functions, or it may be regarded as inactivation of licenses. Moreover, it can also be construed as temporarily returning the licenses granted to the MFP A 180 to the license issuing server. When the inactivation process is completed, a function inactivation certification key is issued (S1401). In the present embodiment, a key is information that is used to carry out a certain process. The function inactivation certification key contains a device ID for specifying a device (the MFP A here) on which the functions have been inactivated. Moreover, the function inactivation certification key also contains an ID that indicates that it is the function inactivation certification key. The issued function inactivation certification key is displayed or printed. When inactivation is completed, programs or data for realizing the inactivated functions is transmitted to the designated destination device (S1402). Although this transfer is realized by communications in the present embodiment, it may also be performed via a storage medium. When transfer is completed, a function replication completion certification key is issued. This key may be issued by the source device; however, in the present embodiment, it is issued by the destination device (S1403). The function replication completion certification key contains the device ID of the destination device of the transferred licenses and an ID that indicates that the key is the function replication completion certification key.

Next, the function inactivation certification key and the function duplication completion certification key are input to a terminal of the license issuing server 101 by the user by manual operation (S1404). In response to this, the license issuing server 101 evaluates the legitimacy and the like of the keys and then updates the database 106 (S1405). The details of the update are to cancel the licenses for the functions associated with the source device of the transferred licenses, which is specified based on the function inactivation certification key, and register the licenses for those functions as functions associated with the destination device of the transferred licenses, which is specified based on the function replication completion certification key. Cancellation of the licenses is also referred to as inactivation. When update of the database is completed, a function activation key (a duplicated function activation key) for the functions to be transferred is issued (S1406). The issued key is displayed or printed. The function activation key contains the device ID of the destination device of the transferred licenses. Moreover, the key desirably contains the device ID of the source device of the transferred licenses.

Next, the user inputs the function activation key to the destination device of the transferred licenses. In response, the MFP B 181, which is the destination device of the transferred licenses, performs an activation process of the functions (specifically, programs or data) replicated from the MFP A 180. To determine whether a function is a replication from the MFP A 180, for example, the device ID of the source device of the transferred licenses (the MFP A 180 here) is added to application programs or the like in advance at the time of transmission from the MFP A 180. On the other hand, the function activation key is made to contain the device ID of the source device of the transferred licenses, so that the device IDs in both keys can be checked against each other, and any function for which the device IDs are the same can be activated. Next, the foregoing procedure will be described with respect to each apparatus.

<Issuance of Function Inactivation Certification Key>

Figure 10:
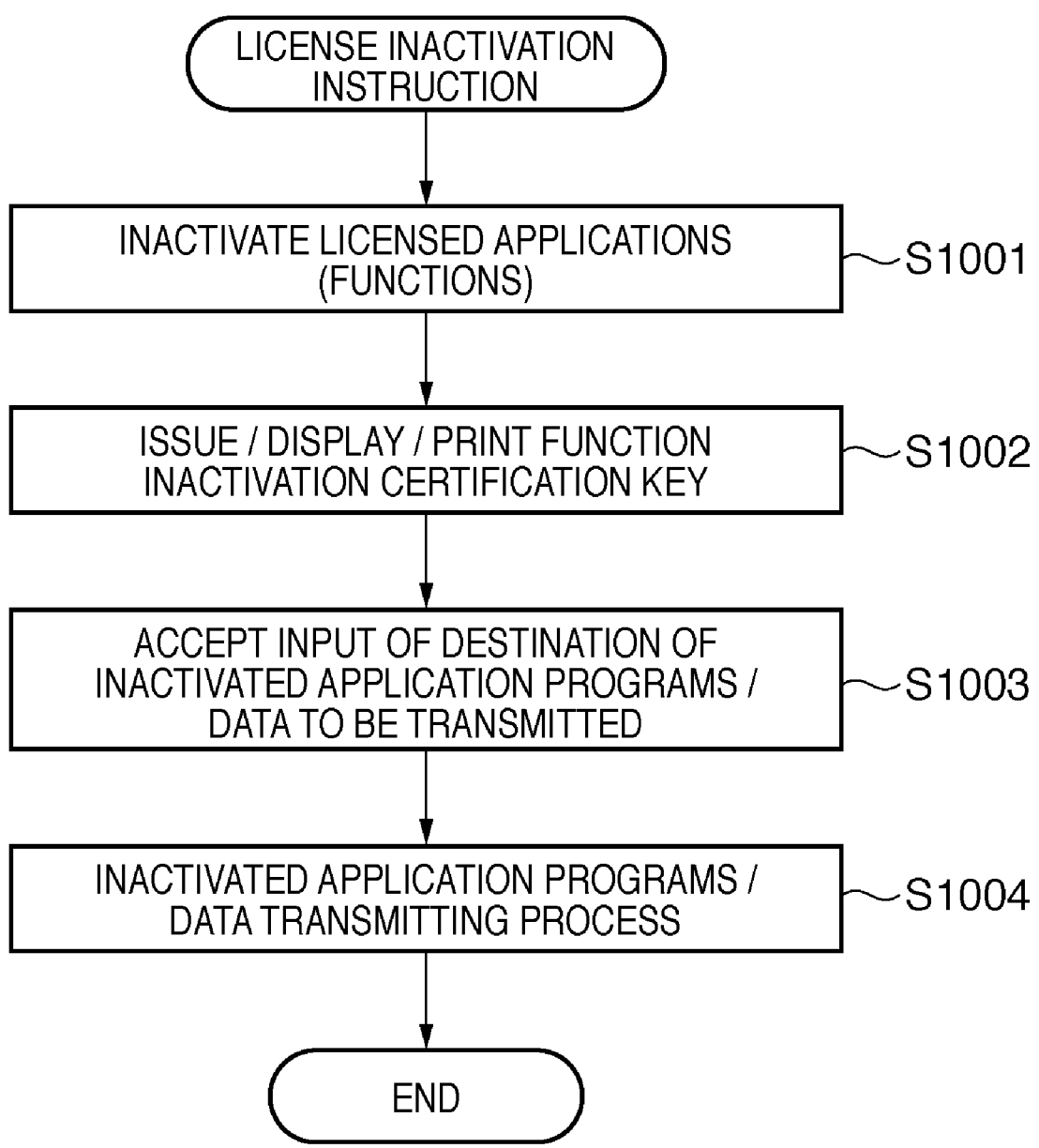
FIG. 10 is a flowchart of a license inactivation process at the source device of transferred licenses.

FIGS. 5A to 5C show an example of touch panel screen display of the source device of the transferred licenses, namely, the MFP A 180, for issuing the function inactivation certification key. The user can input a licensing key, inactivate functions (also referred to as optional functions), and issue the function inactivation certification key on this screen. It should be noted that although a detailed description of a procedure by which a license is granted anew is omitted in the present embodiment, for example, the user can designate a function to be licensed anew and input a key for licensing, thereby installing a program or the like of the function. The key for licensing is issued by the license issuing server 101, and at the same time, the device ID of the device to which the license is to be granted and the function are registered in the database 106 in association with each other. Hereinafter, a procedure and the like at the time when licenses for functions that have already been granted to the MFP A are transferred to the MFP B will be described. FIG. 10 is a flowchart of a function inactivation process procedure at the source device of the transferred licenses.

Figure 9:
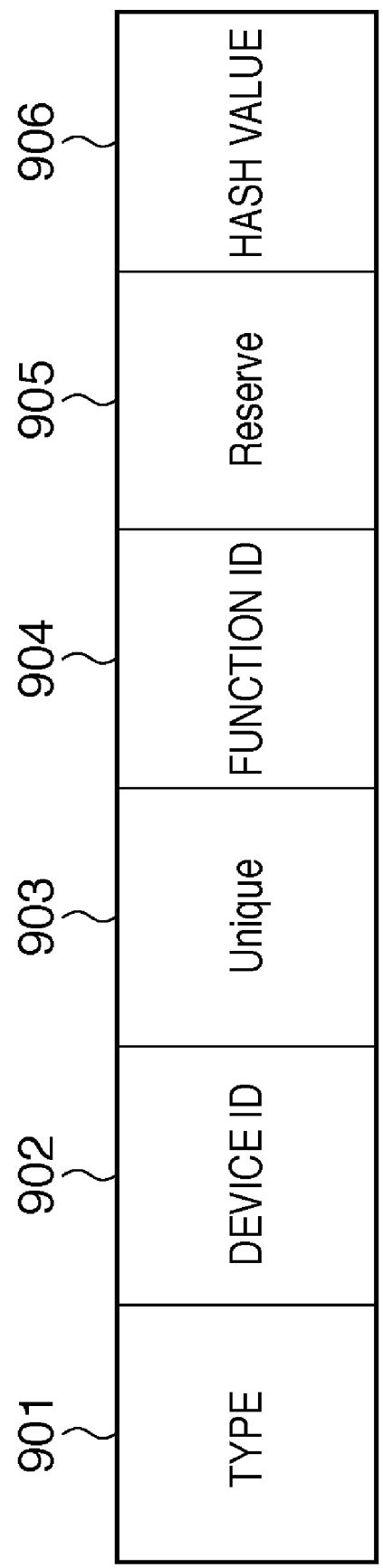
FIG. 9 is a diagram illustrating a structure of key information.

First, the user inputs an instruction to perform license inactivation by pressing an OK button in a window 501 in FIG. 5A. This triggers the start of the process in FIG. 10. In FIG. 10, first, all the functions (applications) licensed to the source device of the transferred licenses are inactivated (S1001). Next, a function inactivation certification key is issued (S1002). The key information has a configuration shown in FIG. 9. Specifically, the key information contains a type 901 that indicates the type of the key, a device ID 902, unique information 903, and a function ID 904. The rest is a reserved portion and a hash value for preventing an error or counterfeiting of the key. An ID of the function inactivation certification key is described in the type 901, and the device ID of the source device of the transferred licenses is described in the device ID 902. In the present embodiment, an ID that indicates all of the licensed functions is described in the function ID 904. This ID may be IDs of individual functions, or it may be an ID that indicates that all of the functions have been inactivated. The issued function inactivation certification key is displayed in a window 502 of FIG. 5B. Although not shown, an instruction button for printing may also be provided therein.

Next, input of the device ID of the destination (i.e., the destination device of the transferred licenses) to which the applications or the like of the inactivated functions are transmitted is accepted (S1003). This window is a window 503 in FIG. 5C. When the transmission destination is indicated, the programs, data, or the like of the functions inactivated in step S1001 are transmitted to the indicated transmission destination device (S1004).

In the above-described manner, all the licenses on the device as the transfer source are inactivated, and resources related to the inactivated functions are transmitted to the device as the transfer destination. Then, a function inactivation certification key that indicates the completion of inactivation is issued. Although here the key is output in the form that appeals to the eye of the user, the key may also be output as, for example, electronic information that can be saved in a storage device.

<Issuance of Function Duplication Completion Certification Key>

Figure 6:
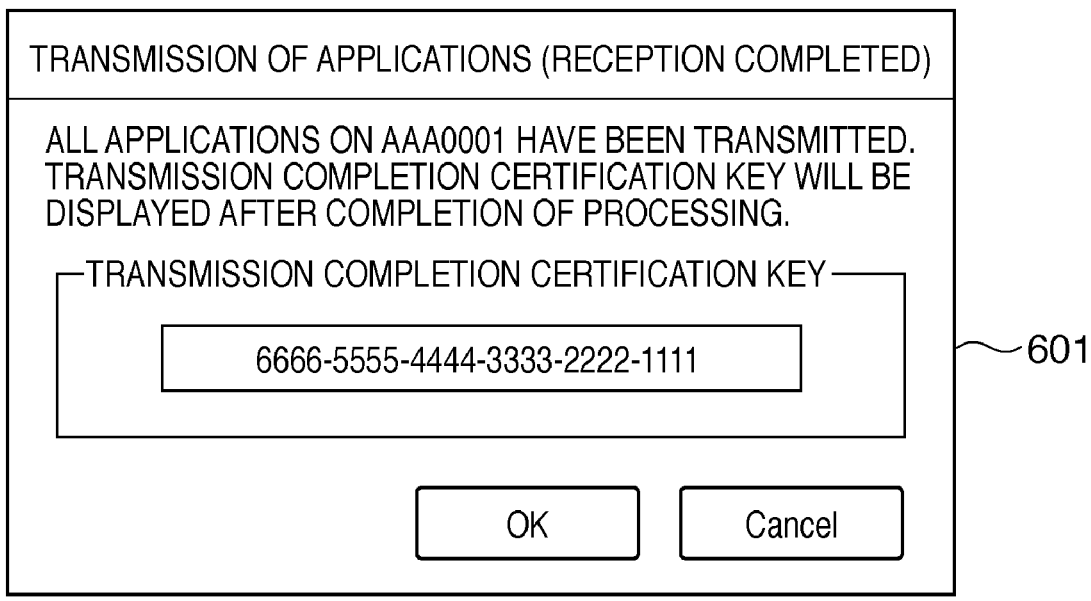
FIG. 6 is a diagram showing an example of a user interface of a destination device of transferred licenses.
Figure 11:
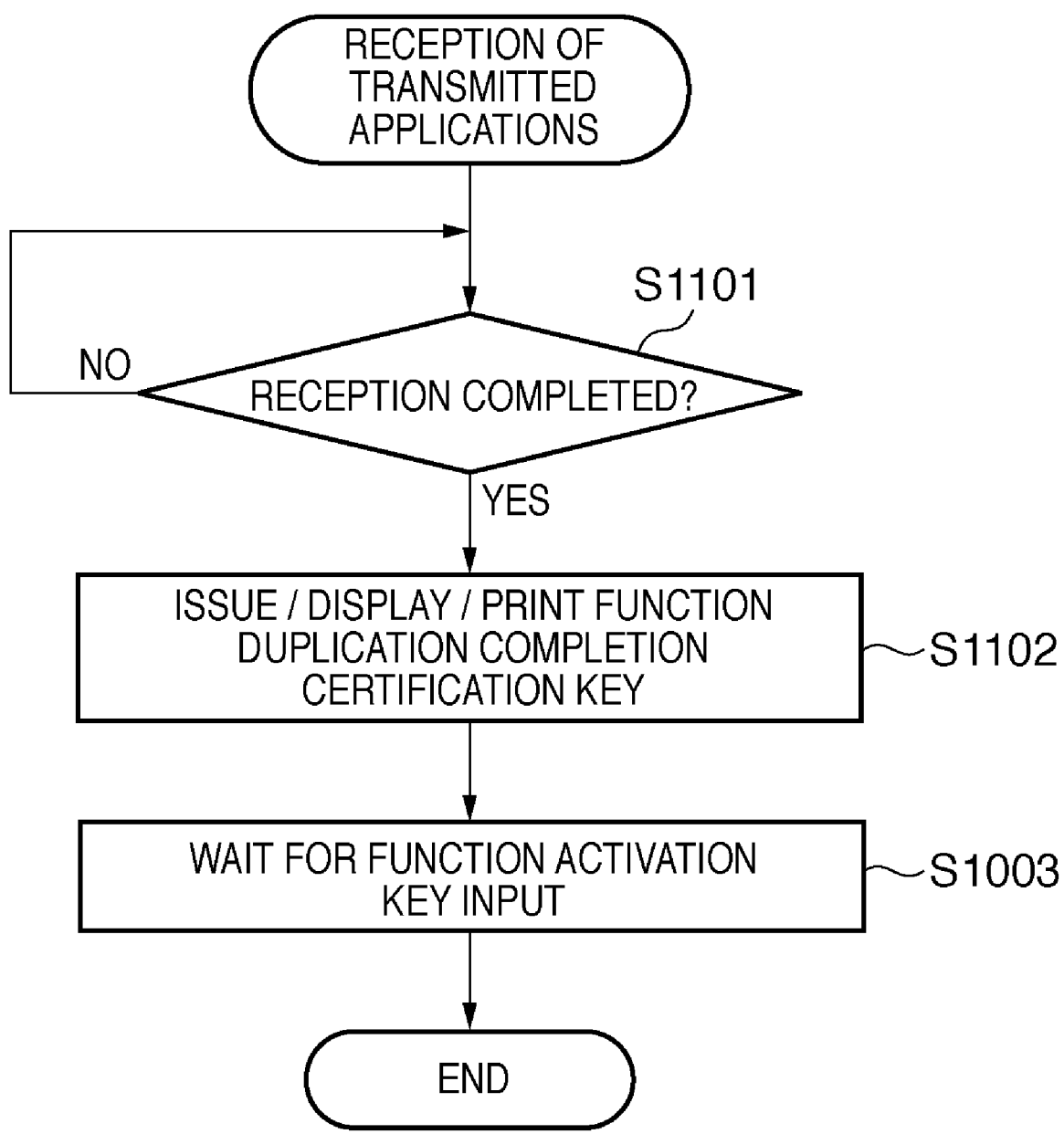
FIG. 11 is a flowchart of an application receiving process at the destination device of transferred licenses.

Next, referring to FIGS. 6 and 11, a function duplication completion certification key issuing process at the destination device of the transferred licenses will be described. In FIG. 11, when the destination device of the transferred licenses receives the resources related to the functions from the source device of the transferred licenses, the process is started. First, it is determined whether the reception has been completed (S1101), and if the reception has been completed, the function duplication completion certification key is issued (S1102). This key is displayed or printed. FIG. 6 shows an example of a window 601 displaying the key. The function duplication completion certification key contains a type that indicates that it is the function duplication completion certification key and function IDs of all of the duplicated functions. Thereafter, the destination device of the transferred licenses waits for input of the function activation key that is issued by the license issuing server 101 (S1103). Instead of simply waiting, the destination device of the transferred licenses, of course, may be temporarily returned to its ordinary operation and accept input of the function activation key according to an operation performed by the user.

<Update of Database and Issuance of Function Activation Key>

Figure 7:
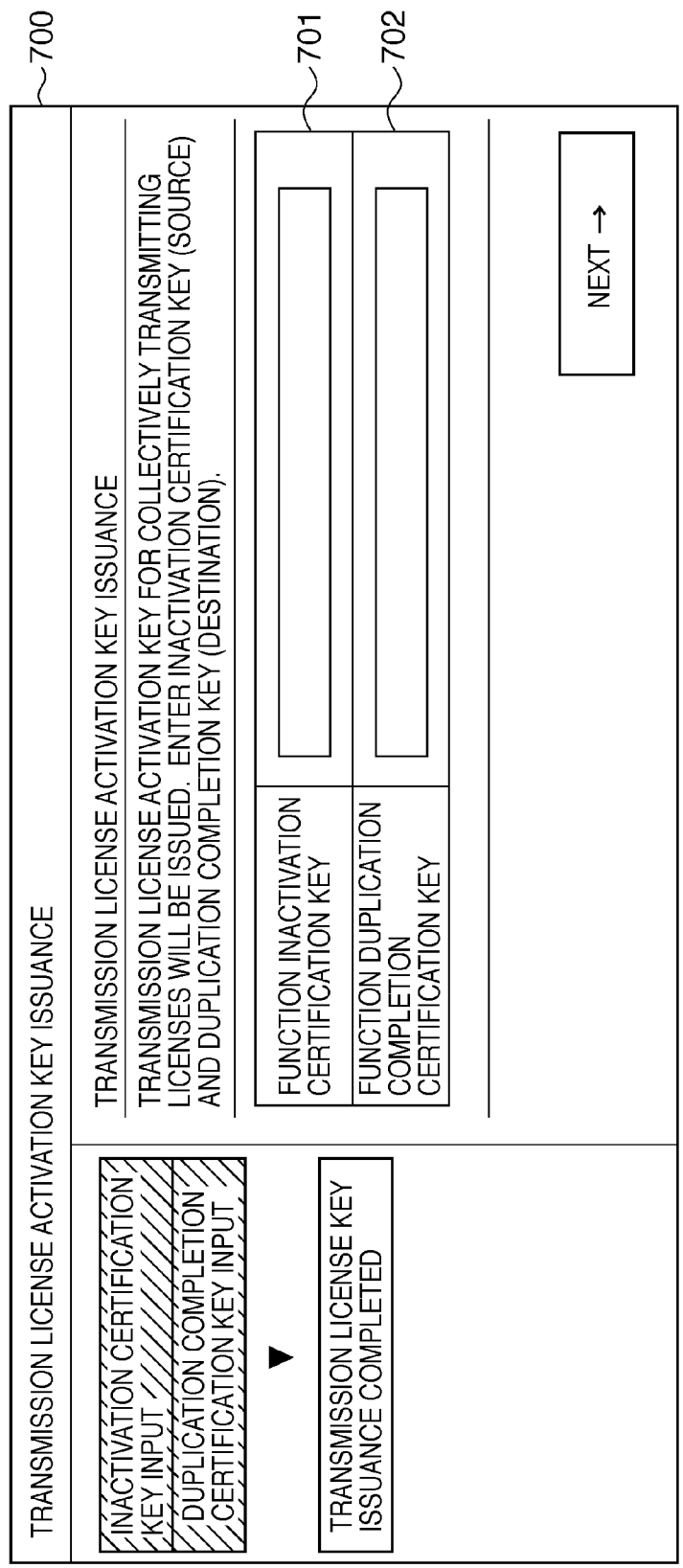
FIG. 7 is a diagram showing an example of a user interface of a license issuing server.

Next, update of the database and a function activation key issuing process at the license issuing server 101 will be described. First, the license issuing server 101 accepts input of the function inactivation certification key (S1301). Moreover, the license issuing server 101 accepts input of the function duplication completion certification key (S1302). The order in which these inputs are accepted may be inverted. FIG. 7 shows an example of a screen for accepting these inputs. A screen 700 includes an input field 701 for the function inactivation certification key and an input field 702 for the function duplication completion certification key, and the key information is input into each input field. The key information to be input has been issued by the procedures of FIGS. 10 and 11, respectively. Then, it is determined whether the input keys are legitimate (S1303). Determination can be made by, for example, recalculating the hash value contained in the key information. Next, the device ID of the source device of the transferred licenses and the functions to be transferred are specified from the function inactivation certification key (S1304 and S1305). Then, the device ID of the source device of the transferred licenses is retrieved from a device ID-function table that is registered in the database 106 and in which an ID of a device to which licenses are to be granted is associated with licensed functions (S1306). Then, a list of functions to be transferred from the source device of the transferred licenses is created (S1307), and an inactivation process of all the functions is applied to the list (S1308). The inactivation process can be performed by changing an active/inactive flag indicating "active" as shown in, for example, FIG. 3 to "inactive".

Next, the device ID of the destination device of the transferred licenses and the functions to be transferred are specified from the function duplication completion certification key (S1309 and S1310). It should be noted that the functions have already been specified in step S1305 and so do not have to be specified here. Then, the device ID of the destination device of the transferred licenses is retrieved from the device ID-function table that is registered in the database 106 and in which an ID of a device to which licenses are to be granted is associated with licensed functions (S1311). Then, a list of functions to be transferred to the destination device of the transferred licenses is created (S1312), and an activation process of all the functions is applied to the list (S1313).

Then, if the database operation is legitimate, the changes applied to the list of the functions to be moved from the source and the list of the functions to be moved to the destination are committed to the database (S1315). As a result, all the functions of the source device of the transferred licenses (the MFP_A) are inactivated as shown in, for example, FIG. 4. On the other hand, all the functions that have been inactivated on the source device of the transferred licenses are associated with the destination device of the transferred licenses (the MFP_B), and all of those functions are activated.

Figure 8:
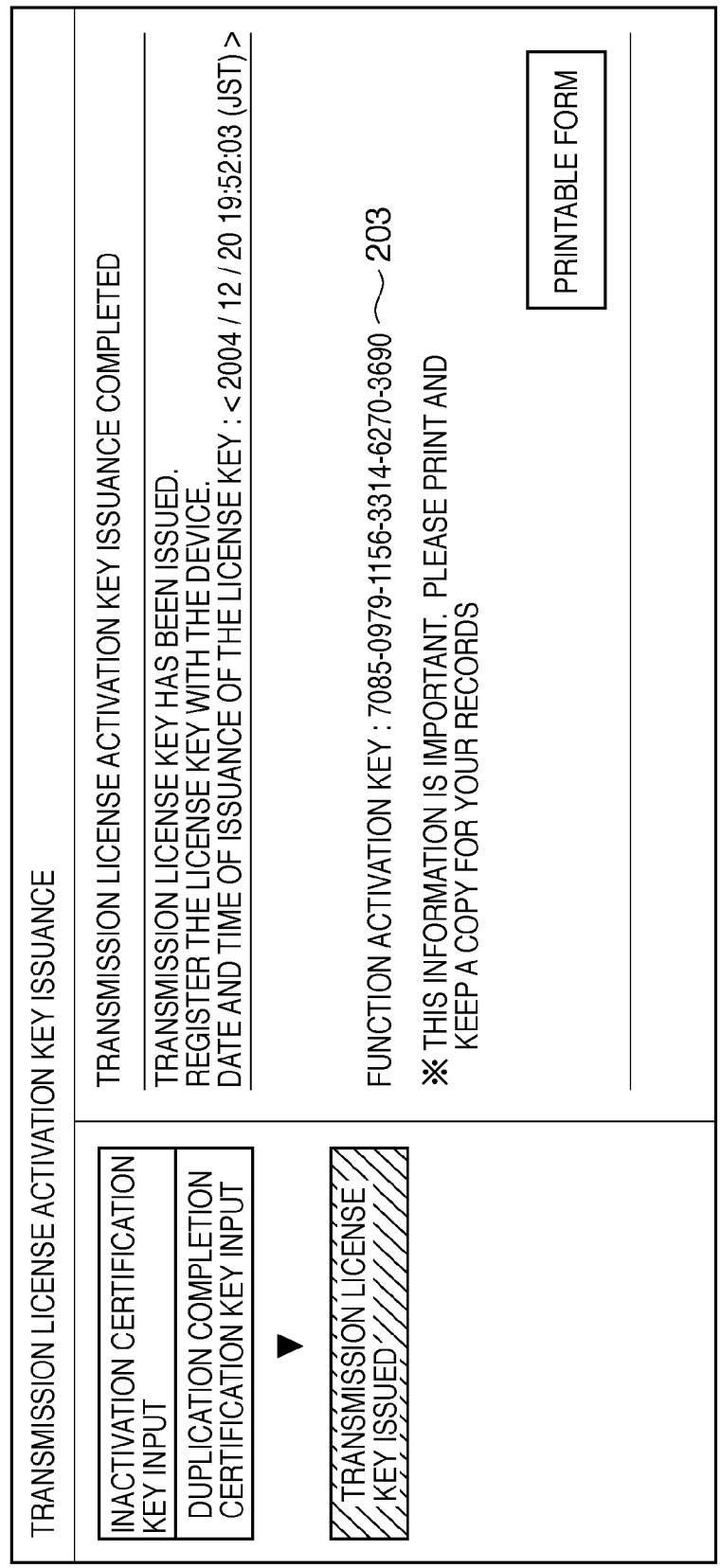
FIG. 8 is a diagram showing another example of a user interface of a license issuing server.

Finally, a function activation key is issued (S1316). The function activation key contains the device ID of the destination device of the transferred licenses for which the key is used and an ID of the functions to be activated. FIG. 8 shows a display example of this key. In FIG. 8, a function activation key 203 is displayed. This can be printed by giving an instruction via a print button.

<Function Activation Process on Destination Device of Transferred License>

Figure 12:
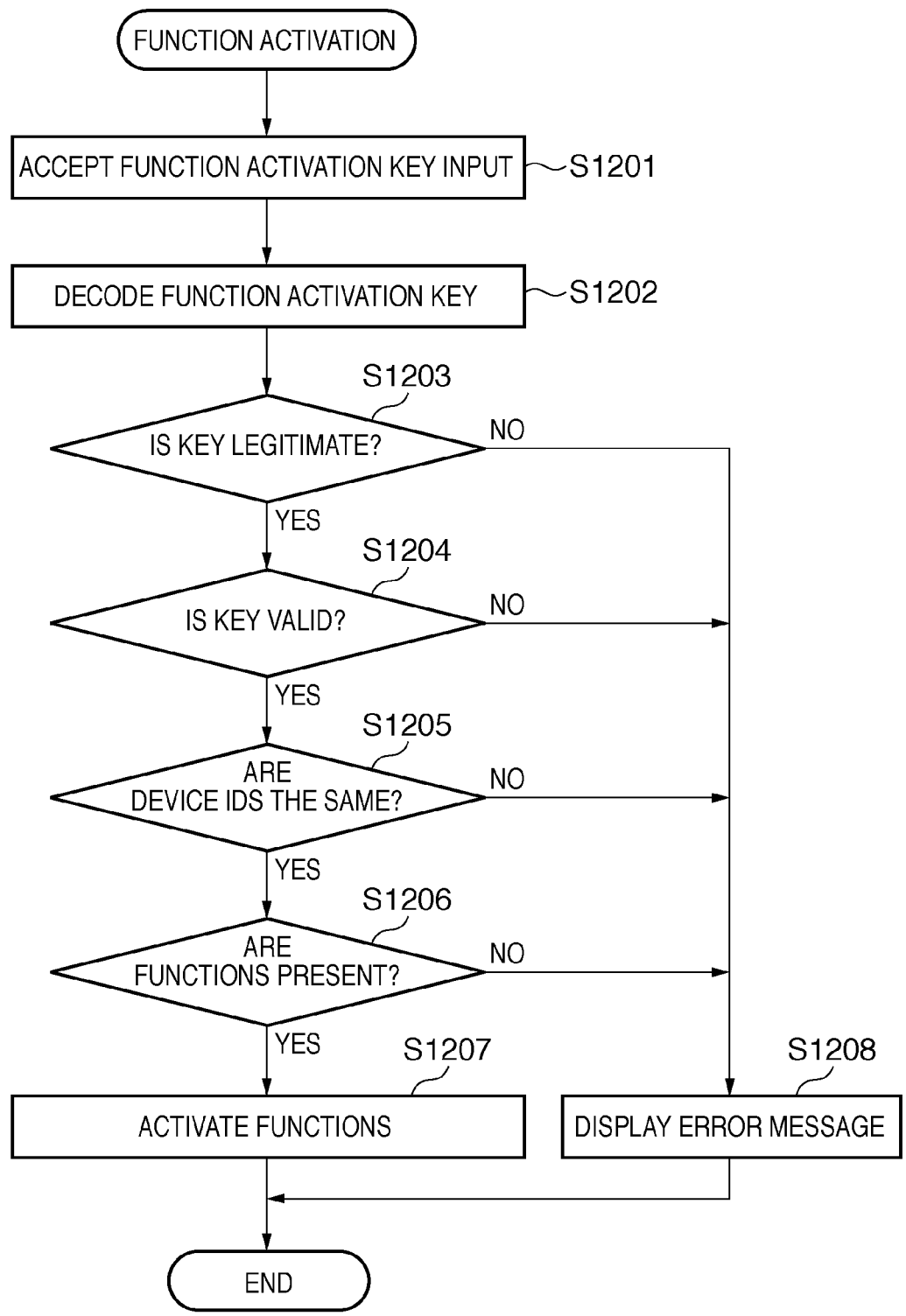
FIG. 12 is a flowchart of a license activation process at the destination device of transferred licenses.

Finally, the transferred functions are activated by inputting the function activation key to the destination device of the transferred licenses. FIG. 12 shows this procedure. In FIG. 12, first, input of the function activation key is accepted (S1201). Next, the input function activation key is decoded (S1202), and the legitimacy of the key is determined using, for example, a hash value (S1203). If the key is legitimate, the validity of the key is determined (S1204). For example, the validity of the key is determined based on an expiration date or the like that has been contained in the key in advance. In the present embodiment, determination of the validity is not particularly performed. Next, it is determined whether the device ID contained in the key is the same as the device ID of the destination device of the transferred licenses to which the key is input (S1205). If the device IDs are the same, it is determined whether the functions specified by the function IDs contained in the key are present on the destination device of the transferred licenses (S1206). If they are present, those functions are activated (S1207). Activation of the functions may be performed by, for example, setting an active flag associated with each function. Moreover, if it is determined NO in any of steps from S1203 to S1206, an appropriate error message is displayed.

Through the foregoing procedure, all the optional functions that were active on the source device of the transferred licenses can be made available on the designated destination device of the transferred licenses. Moreover, all the functions to be transferred can be collectively operated, and the operation is simple. Furthermore, even if the procedure is stopped halfway, the use of any unlicensed function can be prevented.

More specifically, according to the invention of the present embodiment, resources related to optional functions of a plurality of application programs or the like can be transmitted at one time. Moreover, the procedure required for activation of a plurality of applications can be simplified. Furthermore, according to the invention of the present embodiment, the database can be updated simply by inputting at most two pieces of key information to the license issuing server.

An advantage is provided when an operator of the license issuing server 101 and the transfer destination device are not connected to each other on a network, that is, when they are offline. For example, the operator of the license issuing server 101 and a user of the MFP_B, the MFP_A, or the like, which is the transfer destination device, can exchange the function activation key via voice communications over the telephone. This is because the length of the function activation key is short. If all the program names, function names, and the like are contained in the function activation key, the function activation key is considerably long. In this case, exchange of the function activation key via voice communications is impossible, and so a network channel is necessary. According to the present embodiment, however, the names and the like of the functions and the programs to be activated do not have to be contained in the function activation key, and, therefore, the function activation key can be made short. Thus, even when a serviceman for the MFP_A or the like is not allowed to bring a PC into a customer site for security reasons, the serviceman can obtain the function activation key from the operator of the license issuing server 101 over the telephone and input the key.

It should be noted that the present invention may be applied to a system constituted by a plurality of devices (e.g., a host computer, an interface device, a reader, and a printer) or may be applied to an apparatus (e.g., a copier or a facsimile machine) consisting of a single device. Moreover, the aspects of the present invention are also achieved by supplying a recording medium on which a program that realizes the functions of the above-described embodiment is recorded to a system or an apparatus and allowing a computer of the system or the apparatus to read out and execute the program stored on the storage medium. In this case, the program read out from the storage medium realizes the functions of the above-described embodiment in itself, so the program itself and the storage medium storing the program constitute the present invention.

Moreover, the present invention also includes the case where an operating system (OS) or the like running on the computer executes actual processing in part or in whole based on an instruction from the program, and the functions of the above-described embodiment are realized by the processing. Furthermore, the present invention is also applicable to the case where the program read out from the storage medium is written in the memory of a function expansion card inserted into the computer or a function expansion unit connected to the computer. In this case, a CPU or the like of the function expansion card or the function expansion unit executes actual processing in part or in whole based on an instruction from the written program, and the functions of the above-described embodiment are realized by the processing.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-120768 filed May 2, 2008 which is hereby incorporated by reference herein in its entirety.

What is claimed is:

1. A system including a license management apparatus which uses a database in which a first device is registered in association with licenses for functions of the first device, comprising:

one or more hardware processors;

an accepting unit configured to accept an inactivation certification key containing a device ID of the first device as a source device of transferred licenses, the inactivation certification key being issued by the first device, and a duplication certification key containing a device ID of a second device as a destination device of the transferred licenses, the duplication certification key being issued by the second device when the second device has received resources of the functions from the first device and the duplication certification key indicating a completion of duplication of the functions;

an inactivation unit configured to inactivate, in the database, licenses for functions registered in association with the first device that is specified based on the accepted inactivation certification key;

a registration unit configured to register, in the database, the licenses for the functions that have been inactivated for the first device in association with the second device that is specified based on the accepted duplication certification key; and an activation key issuance unit configured to issue an activation key to be inputted to the second device to permit an activation process of the functions for which the licenses have been registered in association with the second device;

wherein the accepting unit accepts offline input of the inactivation certification key and the duplication certification key, and the issuance unit is configured to issue the activation key offline; and wherein the accepting unit, the inactivation unit, the registration unit, and the activation key issuance unit are implemented, at least in part, by the one or more hardware processors.

2. A license management method of a license management apparatus using a database in which a first device is registered in association with licenses for functions of the first device, the method comprising the steps of:

accepting an inactivation certification key containing a device ID of the first device as a source device of transferred licenses, the inactivation certification key being issued by the first device, and a duplication certification key containing a device ID of a second device as a destination device of the transferred licenses, the duplication certification key being issued by the second device when the second device has received resources of the functions from the first device and the duplication certification key indicating a completion of duplication of the functions;

inactivating, in the database, licenses for functions registered in association with the first device that is specified based on the accepted inactivation certification key; and registering, in the database, the licenses for the functions that have been inactivated for the first device that is specified based on the accepted duplication certification key; and issuing an activation key to be inputted to the second device to permit an activation process of the functions for which the licenses have been registered in association with the second device;

wherein the accepting includes accepting offline input of the inactivation certification key and the duplication certification key, and the activation key is issued offline.

3. A non-transitory computer-readable storage medium storing a program that, when executed by a computer, causes the computer to perform a license management method of a license management apparatus using a database in which a first device is registered in association with licenses for functions of the first device, wherein the method comprises the steps of:

accepting an inactivation certification key containing a device ID of the first device as a source device of transferred licenses, the inactivation certification key being issued by the first device, and a duplication certification key containing a device ID of a second device as a destination device of the transferred licenses, the duplication certification key being issued by the second device when the second device has received resources of the functions from the first device and the duplication certification key indicating a completion of duplication of the functions;

inactivating, in the database, licenses for functions registered in association with the first device that is specified based on the accepted inactivation certification key;

registering, in the database, the licenses for the functions that have been inactivated for the first device in association with the second device that is specified based on the accepted duplication certification key; and issuing an activation key to be inputted to the second device to permit an activation process of the functions for which the licenses have been registered in association with the second device;

wherein the accepting includes accepting offline input of the inactivation certification key and the duplication certification key, and the activation key is issued offline.

* * * * *